United States Patent [19]

Goodyear

[11] 3,912,883

[45] Oct. 14, 1975

[54] DIRECT CURRENT SUPERVISORY SYSTEM

[75] Inventor: Walter David Goodyear, Owen Sound, Canada

[73] Assignee: General Signal Corporation, Rochester, N.Y.

[22] Filed: Mar. 26, 1974

[21] Appl. No.: 454,872

[52] U.S. Cl. .......... 179/175.3 R; 340/409

[51] Int. Cl.[2] .......... H04B 3/46

[58] Field of Search... 179/175.3 R, 175.2 C, 1 MN; 340/409, 214, 253 R, 253 B; 324/51

[56] References Cited

UNITED STATES PATENTS

| | | | |
|---|---|---|---|
| 3,021,397 | 2/1962 | Barnett et al. | 179/175.3 R |
| 3,588,890 | 6/1971 | Cox | 340/409 |
| 3,656,158 | 4/1972 | Goodwater | 179/175.3 R |
| 3,702,474 | 11/1972 | Fink et al. | 340/409 |
| 3,808,381 | 4/1974 | Jacobs et al. | 179/175.3 R |
| 3,812,303 | 5/1974 | Stewart | 179/175.3 R |

*Primary Examiner*—Kathleen H. Claffy
*Assistant Examiner*—Douglas W. Olms
*Attorney, Agent, or Firm*—Pollock, Philpitt & Vandesande

[57] ABSTRACT

A supervisory system for a plurality of line wire pairs which line wire pairs may be used for distribution of audio or digital information. DC energy, for supervisory purposes, is supplied to each of the line wire pairs which are separately and continuously monitored for faults. The continuous monitoring of the line wire pairs takes place even after detection of a fault so that, when the fault is repaired, the equipment automatically responds to the repair. The faults that can be detected include short and open circuits. Detection of an open circuit is signaled but information is allowed to flow down the opened line pair as far as possible. Detection of a short circuit results in removing the information transmission to protect information flow on other line wire pairs. A resistor across each line wire pair at the detection point ensures a minimum flow of direct current so that polarized capacitors can be used rather than less desirable bipolar capacitors.

9 Claims, 3 Drawing Figures

DIRECT CURRENT SUPERVISORY SYSTEM

FIELD OF THE INVENTION

This invention pertains to supervisory circuits for monitoring the condition of line wires in an information transmission system which may connect a central station to a plurality of remote stations.

BACKGROUND OF THE INVENTION

Supervision systems for supervising line wire pairs in information transmission systems is an art which has been widely developed. The information transmission systems for which line supervision systems have been developed include fire alarm, audio systems including audio alarm systems, paging systems, background music systems, and telemetering systems, including both analog and digital. However, the prior art supervision systems exhibit one or more of the following difficulties. In some systems, no supervision is possible if information transmission is not taking place. That is, the supervising system relies on the information transmission signals for power. Of course, the difficulty with this approach is that, for example, in a fire alarm system, information is only being transmitted in such prior art systems when an alarm has to be sounded. If, at that time, the system detects that one or more of the line wire pairs are inoperative, of course a dangerous condition exists because the inoperative pair of line wires will be unable to transmit the fire alarm as required. As a further example, in telemetering systems it is often the supervision scheme to poll the various stations when information transmission is desired. At that time, if a station fails to respond, the system detects this as a failure in the line wire pair connecting that station to the system. However, it should be apparent that because of this failure the information cannot be transmitted. As a further example, in a background music system of course the user would be aware of a failure in a line wire pair if he fails to hear music. However, if the remote music loud speaker has been turned off, there is no way of knowing whether or not the line wire pair connecting that speaker to the system is operative. Thus, the basic drawback of such systems is their failure to provide a constant check on the integrity of the system so that any fault can be promptly corrected and thus not interfere with the sending of necessary information, as during an emergency.

Another failing of the prior art systems is that when a failure is detected, the detecting system is then switched out of the circuit and thus the line is no longer monitored. As a result, when the failure is corrected, it is then necessary to go back to the detecting equipment and reset it so that again it becomes responsive to the condition of the line wire pairs.

Another failing of the prior art systems is their cost. Of course, since a supervision system is an "add-on," its cost must be closely controlled. To overcome some of the problems mentioned above, some prior art systems employ a high frequency signal for supervision purposes. Of course, such a system requires at the very least, a high frequency oscillator to provide the high frequency signals. Furthermore, such a system may require special filtering apparatus to separate the audio and supervisory signals which merely adds to the cost of the apparatus.

Finally, some supervision systems are disconnected when an alarm or message is to be transmitted. Usually this is required, where the supervision energy is AC, to avoid distortion introduced by reason of mixing the alarm and/or message with the supervision energy. See, for example U.S. Pat. No. 3,656,158. These systems have two characteristics that are undesirable. In the first place switching equipment is required to disconnect the supervisory system which adds to the system cost. In addition the supervision system is inoperative at the very time it is most important to have it operating, i.e. when an alarm or message is transmitted. As a result, with systems of this type, there is no assurance when an alarm or message is sent, that such alarm or message is being received.

SUMMARY OF THE INVENTION

The present invention overcomes these and other problems in the prior art supervision systems by superimposing direct current supervision energy onto the information transmission system. As a result, whether or not the information transmission system is actually operating, the direct current is available for supervision and detection purposes. Although it is necessary to separate the DC supervision energy from the audio for purposes of detection the filtering is achieved without burdening the system with expensive equipment.

In addition to the conventional end-of-line resistor, each pair of line wires has associated therewith a start-of-line resistor connected across the pair at the central or monitoring station. This start-of-line resistor ensures the supervision system of a minimum flow of direct current at all times, even when the line wire pair may be short-circuited or open-circuited. This minimum flow of direct current enables the system to employ more desirable polarized capacitors instead of the bipolar type. The bipolar type of capacitors are relatively undesirable due to their higher cost.

The detector in the supervision system monitors the direct current flow on one of the pairs of line wires and develops a voltage proportional thereto. This sensed voltage is compared with reference voltage limits which are derived from the direct current source. If the sensed voltage exceeds one of the reference voltages or becomes less than the second reference voltage, the supervision system detects a failure. In one case an indicator light may be energized to indicate an open circuit on the line. Those skilled in the art will perceive that the supervision system remains operating even though an open-circuit condition has been detected. As a result, when the open circuit is repaired, the supervision system continues monitoring the line wire pair and detects this change from an abnormal back to the normal condition. As a result, the open circuit indicator is extinguished and the system continues in operation.

In the other case, a short circuit is detected. In this condition, the detector operates a control means which open circuits the connection between the shorted line wire pair and the information transmission system. However, supervision energy continues to flow in the short-circuited line wire pair. The impedance of the detector is made high so that the short circuit current does not become excessive. The information transmission system is disconnected from the line wire pair so that the short-circuit in one line wire pair does not affect the operation of the information transmission system with respect to other line wire pairs. Those skilled in the art will perceive that the detection system remains in operation, regardless of the short-circuited condition. As a result, when the short-circuited condition has been repaired, the supervision system detects this and responds thereto, automatically reconnecting the information transmission to the now-repaired line wire pair.

Additionally the supervision energy is constantly available even when information (alarms or messages) is being transmitted. As a result the supervision system monitors the line wire pairs at all times.

In a preferred embodiment of this invention, disclosed herein, the information transmission system whose line wire pairs are being supervised comprises a combination alarm audio system. The audio portion of this system may comprise paging or background music and the alarm may be useful to indicate a fire or other dangerous condition. A plurality of line wire pairs may connect a central transmitting and supervising station with a number of remote stations. A group of remote stations may be located, for instance, on each different floor of a building, and may each be connected to a single line wire pair.

As is disclosed herein, the detector may be connected to be responsive to DC current flow on either line of the line wire pair.

Those with ordinary skill in the art will understand that the information transmission system which is being supervised by the system of the present invention may be one of a variety of systems some of which have been mentioned hereinabove.

BRIEF DESCRIPTION OF THE DRAWINGS

The remainder of the specification will describe in detail a number of preferred embodiments of the present invention, some of which are illustrated in the accompanying drawings, in which.

DETAILED DESCRIPTION OF THE PREFERRED EMBODIMENTS

Figure 1:
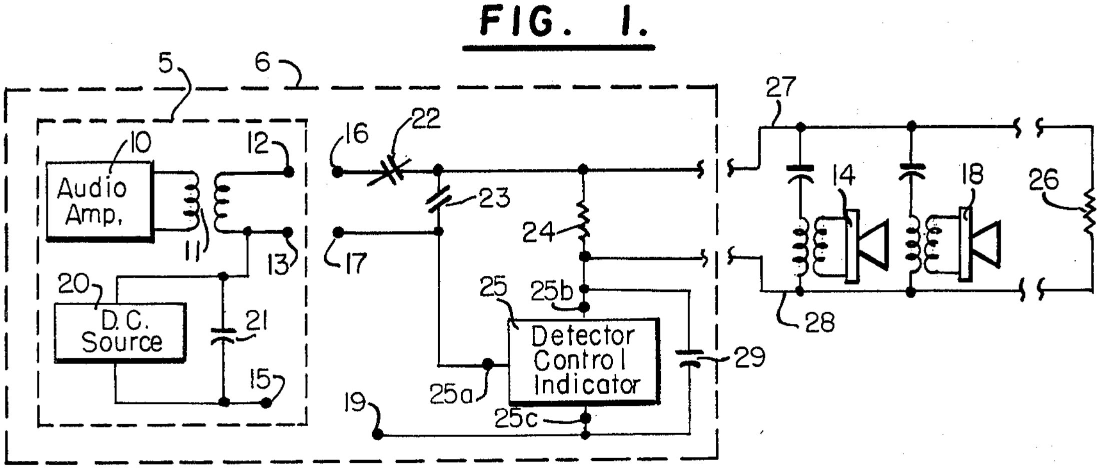
FIG. 1 is a schematic diagram of the supervision system of the present invention monitoring a pair of line wires in an audio-alarm information transmission system.

FIG. 1 illustrates the supervision system of the present invention supervising one pair of line wires in an audio-alarm system. Such a system may be useful, for instance, to provide background music, information messages such as paging services and alarm messages to the various floors of a building. In such a system, for instance, one pair of line wires may serve each of the audio transducers on a floor. Of course, in a multistory building, there would be one pair of line wires for each floor in the building.

The common equipment for the supervision and information transmission system includes the apparatus within the dotted lines 5 shown in FIG. 1. This apparatus includes an audio amplifier 10 whose output is connected across one winding of a transformer 11. The second winding of this transformer is connected to terminals 12 and 13. The audio amplifier 10 is representative of an information source in an audio-alarm system. This amplifier can provide background music, audio messages such as a paging system, and audio alarms to a plurality of loudspeakers distributed throughout a building. The manner in which these various signals are provided to the audio amplifier 10 is conventional in the art and forms no part of the present invention. However, the supervision system cooperates with the audio-alarm system as will be discussed hereinafter.

A source of direct current energy 20 has a polarized capacitor 21 connected across it. This parallel combination is connected between terminals 13 and 15.

The foregoing apparatus constitutes the common equipment for both the information transmission network and the supervision network. For each pair of line wires, the central office contains, in addition to the foregoing, the additional apparatus contained within the dash line 6. This circuit is connected to terminals 16, 17, and 19 which are respectively connected to terminals 12, 13, and 15. Of course, for additional pairs of line wires, not illustrated, additional terminals such as 16, 17, and 19 will be provided and connected in parallel with terminals 16, 17, and 19, respectively. Terminals 16 and 17 have connected serially therebetween normally closed contacts 22 and normally open contacts 23. The apparatus which controls these contacts will be explained in more detail hereinafter. The common point between normally closed contacts 22 and normally open contacts 23 is connected to one of the two line wires 27 of the pair of line wires. Connected across the line wires 27 and 28 is a resistor 24. One input **25*b* of Detector Control Indicator 25 is connected to the junction of resistor 24 and line wire 28. A second input 25*a* to the detector, control, indicator 25 is connected to the common point of terminal 17 and normally open contact 23. Finally, terminal 25*c* of the Detector Control Indicator 25 is connected to terminal 19. A second polarized capacitor 29 is connected across terminals 25*b* and 25*c*.**

The circuitry connected across line wires 27 and 28 external to the dash line 6 represents the connection between the central transmitting and supervising station to the remote receivers. At the termination of line wires 27 and 28 a second resistor 26 is provided. Intermediate the line wires a plurality of loudspeakers 14, 18, etc. is illustrated. Those with ordinary skill in the art will understand that the number of transducers connected across line wires 27 and 28 is relatively arbitrary as long as sufficient power is available from the information transmission system to drive them.

Figure 2:
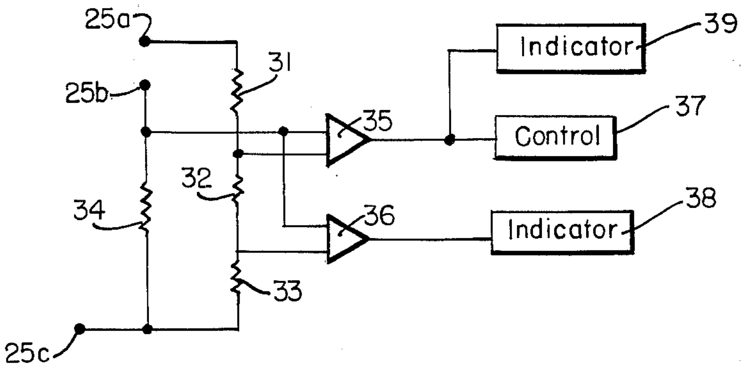
FIG. 2 is a schematic of the detector means, control means and indicator means which is one component illustrated in FIG. 1.

FIG. 2 illustrates the Detector Control Indicator 25. The terminals **25*a*, 25*b*, and 25*c* represent the terminals with the same reference characters as illustrated in FIG. 1. A voltage divider is connected between terminals 25*a* and 25*c* comprising resistors 31, 32, and 33. Terminal 25*b* is connected to terminal 25*c* through a resistor 34. Differential amplifiers 35 and 36 are provided with voltages developed across resistors 32, 33, and 34. In particular, one input to differential amplifier 35 is provided by the voltage dropped across resistors 32 and 33. The other input to differential amplifier 35 is the voltage drop across resistor 34.**

The voltage drop across resistor 33 provides one input to differential amplifier 36. The second input to differential amplifier 36 is the voltage developed across resistor 34.

The voltage drop across resistor 34 is proportional to the direct current flowing in one of the line wires. This voltage is compared in differential amplifiers 35 and 36, with two reference voltages which are related to the voltage provided by DC source 20. If the sensed voltage exceeds (in the illustrated embodiment) the first or higher reference voltage the system determines that a short-circuit condition exists on the pair of line wires being monitored. As a result, differential amplifier 35 responds distinctively to this condition to energize control 37 and indicator 39. Indicator 39 can be a lamp or other indicating means to indicate that the line wires associated with the detector have a short-circuit condition. Control 37 operates to open normally closed contacts 22 and close normally open contacts 23. The reason for this will appear hereinafter.

If the sensed voltage developed across resistor 34 decreases below the second reference voltage, developed across resistor 33, differential amplifier 36 distinctively responds to this condition. The apparatus (in the illustrated embodiment) interprets this as an open-circuited condition on the pair of line wires associated with the detector. An appropriate indicator 38 is controlled by the distinctive condition of amplifier 36 to indicate this condition.

Figure 3:
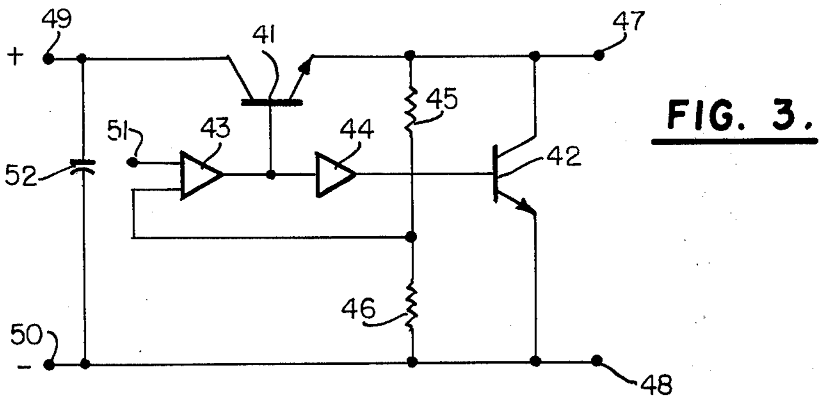
FIG. 3 is a schematic of one form of direct current energy supply that can be employed in the present invention.

FIG. 3 illustrates the direct current power source. A source of direct current is applied to terminals 49 and 50. A polarized capacitor 52 connects terminals 49 and 50 for filtering purposes. The collector-emitter terminals of transistor 31 connect terminal 49 to output terminal 47. The collector-emitter circuit of transistor 42 is connected between output terminals 47 and 48. A voltage divider comprising resistors 45 and 46 is connected across the output terminals 47 and 48. The voltage produced by the voltage divider at the junction of resistors 45 and 46 is provided as one input to an amplifier 43. The other input to this amplifier is provided with a reference voltage at terminal 51. The output of amplifier 43 is connected as an input to amplifier 44 as well as to the base of transistor 41. The output of amplifier 44 is connected to the base of transistor 42. Transistors 41 and 42 are respectively a series pass regulator and a common shunt regulator.

A predetermined portion of the output voltage provided at terminals 47 and 48 is provided by the voltage divider comprising resistors 45 and 46 as one input to amplifier 43. The amount by which this voltage is below the reference voltage provided at terminal 51 controls the voltage provided to the base of transistor 41. This signal tends to increase the current provided to transistor 41 if the output voltage decreases to maintain the output voltage at terminals 47–48 at its nominal value. If the output voltage at terminals 47–48 increases beyond its normal range, the predetermined portion of this voltage provided to amplifier 43 will exceed the reference voltage provided at terminal 51. This will result in a higher base voltage to transistor 42 to drain current from the output terminals 47–48. This results in, of course, lowering the output voltage at terminals 47–48.

Now that the various components of the supervision system have been disclosed the operation will be discussed.

Under normal conditions and regardless of whether or not any audio signals are provided by audio amplifier 10 through the line wires 27–28, the direct current source 20 provides a predetermined direct current voltage through the secondary of transformer 11, terminal 12, terminal 16, and normally closed contact 22. Some of this current flows through resistor 24 to input terminal **25*b*. Assuming no open circuits in the line wires 25–28, additional direct current will flow to the terminal 25*b* on return line wire 28, after flowing through resistor 26. A capacitor 29 provides a bypass path for alternating current around the Detector Control Indicator 25. In like manner, the capacitor 21 provides a similar bypass for alternating current around direct current source 20**.

A second input to the Detector Control Indicator 25 via terminal **25*a* is a direct current voltage equal to that provided by source 20 via contacts 13, 17, and 25*a*. The voltage provided through terminal 25*a* develops a current which, passing through resistors 31, 32, and 33, develops first and second reference voltages. The direct current input at terminal 25*b* develops a direct current voltage across resistor 34. This latter direct current voltage is the sensed voltage which indicates the condition of the line wires 27–28. Under normal operation, the resistors 24, 26, 31, 32, and 33 and 34 are so proportioned that the sensed voltage lies between the first and second reference voltages in magnitude. Thus, under normal conditions, neither control 37 nor indicators 38 and 39 are operated. This maintains normally closed contacts 22 closed and normally opened contacts 23** open.

If an open circuit appears on the pair of line wires 26–28, the DC resistance will increase, thereby decreasing the direct current flowing in the circuit. A minimum amount of direct current flows through resistor 24 regardless of the condition of the line wires 27–28. This minimum direct current allows use of polarized capacitors as capacitors 21 and 29, thereby obviating the need for using less desirable bipolar capacitors. In any event, the decrease in the direct current reduces the sensed voltage available across resistor 34. As this sensed voltage decreases below the second reference voltage, differential amplifier 36 responds operating indicator 38 to indicate an open circuit condition on the line.

In a like manner, if a short-circuit condition appears on line wires 27–28, the direct current will increase in response thereto. The direct current resistance of the resistors 31–34 is so proportioned that the increased current due to the short-circuit will not damage the supervision systems components. However, this increased direct current will increase the sensed voltage. As the sensed voltage increases above the first reference voltage, differential amplifier 35 responds operating indicator 39 and control 37. The indicator 39 may be an indicator lamp to record a short-circuit condition on the line. Control 37 operates the contacts 22 and 23. In particular, when control 37 is operated in response to the detection of a short circuit, normally closed contacts 22 open and normally opened contacts 23 close. This operation of contacts 22 and 23 has no effect on the direct current circuit inasmuch as direct current energy can now be provided via terminals 13, 17 and now-closed contacts 23 to the line wires 27–28. However, this operation of the contacts effectively disconnects the audio amplifier from the line wires 27 and 28 at now-open contacts 22.

In the event of a short-circuit, the decreased impedance of the short-circuited line wires could affect proper operation of the audio system on other line wires by loading down the source of audio current. To prevent this the short-circuited line wires are automatically disconnected by the supervision system.

It will be recognized, however, that even under fault conditions, the supervision system continues to supervise and indicate the condition of the faulted line wires. As a result, when the faulted line wires are repaired, the supervision system responds automatically to indicate the now repaired condition of the lines. In particular, if the line wires have been open-circuited then this response merely results in extinguishing indicator 38. On the other hand, if the line wires had been short-circuited the response would not only extinguish indicator 39 but also operate contacts 22 and 23 by control 37 to their normal conditions. This automatically restores audio current to the line wires.

Reference to FIG. 1 will indicate that as many pairs of line wires as necessary can be connected so long as a separate detector, control indicator 25 is provided for each pair of line wires. Each pair of line wires is terminated with resistor 26 and a resistor 24 is provided at the control station.

Although FIG. 1 illustrates the detector control indicator 25 as being connected at terminal **25*b* to the return line wire 28, it is within the scope of the present invention to connect this terminal to line wire 27. In addition to this change, resistor 24 must now be connected between terminal 25*c* and terminal 19. Furthermore, in this embodiment, an open-circuit condition still results in a decrease of direct current. However, because of the open-circuited line, the voltage developed across resistor 34 increases. Therefore, amplifier 35 should, in this embodiment, be connected to indicator 38, to indicate an open-circuit condition. Likewise, differential amplifier 36 should be connected to control 37 and indicator 39 to indicate, when the voltage across resistor 34** decreases that a short-circuit condition exists.

In view of the foregoing description, those with ordinary skill in the art will understand that the supervision system of the present invention may be utilized with systems in which the audio or data information originates at the remote terminals and is coupled to a receiver at the central station. In such embodiment, the system would operate in much the same manner as that disclosed in FIG. 1 save that audio amplifier 10 is replaced by a receiver, and the loudspeakers 14 and 18 would be replaced by a transmitter. As long as the transmitter and receiver operate on alternating current and the supervision system operates on direct current the system would operate in much the same manner as that which has been disclosed.

What is claimed is:

1. A supervisory system for supervising, at a central location, an information transmission system with at least one pair of line wires, said information transmission system including information source connected to said one pair of line wires, said supervisory system comprising, means supplying direct current energy to said pair of line wires, first resistive means connected across said pair of line wires remote from said central location, second resistive means connected across said pair of line wires at said central location, detector means at said central location responsive to the direct current on one of said pair of line wires and, control means connected to said detector means operating in response to said detector means detecting a distinctive trouble condition on said pair of line wires for disconnecting said pair of line wires from said information transmission source.

2. The apparatus of claim 1 in which said information transmission system comprises a plurality of pairs of line wires, each connected to said information source, with first and second resistive means in which further includes a plurality of detector means, one for each pair of line wires, each of said detector means responsive to direct current on the associated pair of line wires and a plurality of control means, each associated with a different one of said detector means for disconnecting the associated pair of line wires from said information source in response to the assoociated detector means detecting a distinctive trouble condition on the associated pair of line wires.

3. The apparatus of claim 1 in which said information transmission system includes a transformer, one winding of said transformer coupled to said pair of line wires and which include in said supervisory system, switches responsive to said control means to open a connection between said pair of line wires and said winding when said control means is operated.

4. The apparatus of claim 2 in which said information transmission system includes a transformer, one winding of said transformer coupled to all said pairs of line wires and which include, in said supervisory system, switches associated with each of said control means, responsive to operation of the associated control means, to open a connection between one of said pairs of line wires and said winding when said control means is operated.

5. The apparatus of claim 1 which further includes indicator means responsive to said detector means for indicating one of the plurality of distinctive trouble conditions on said pair of line wires.

6. The apparatus of claim 2 which includes a plurality of indicator means each associated with a different detector means for indicating one of a plurality of trouble conditions on an associated pair of line wires.

7. The apparatus of claim 1 in which said detector means comprises, a voltage divider connected across said means for supplying direct current energy with at least two taps to provide a pair of reference voltages, a sensing circuit to provide a direct current sensed voltage proportional to said direct current flowing in one of said pair of line wires, and a pair of comparator means each distinctively responsive to the relative magnitude of one of said reference voltages and said sensed voltage.

8. The apparatus of claim 1 in which each of said resistive means includes a resistor.

9. A supervisory system for supervising, at a central location, an information transmission system with at least one pair of line wires comprising, means for supplying direct current supervision energy to said pair of line wires including a pair of terminals, capacitive means coupled across said means supplying direct current, detector means at said central location responsive to the direct current on one of said pair of line wires, and connected between one of said pair of line wires and one of said two terminals of said means for supplying direct current, resistive means connected across said pair of line wires remote from said central location, second capacitive means connected across said detector means, second resistive means connected across said pair of line wires at said central location, and both said first and second capacitive means including polarized capacators.

* * * * *